Sept. 9, 1969  E. P. COX  3,465,446
SCOPE SIGHT LENS PROTECTOR
Filed Jan. 27, 1969  2 Sheets-Sheet 2
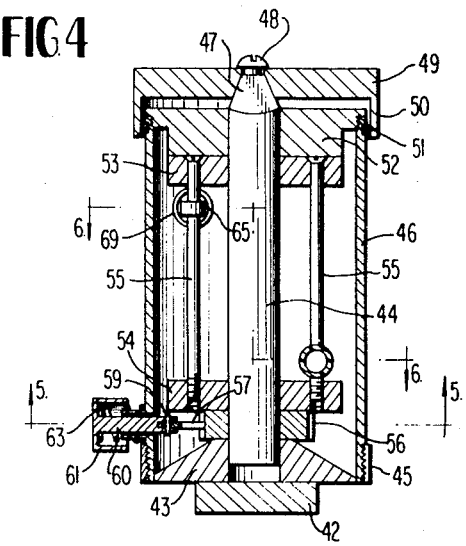
FIG 4
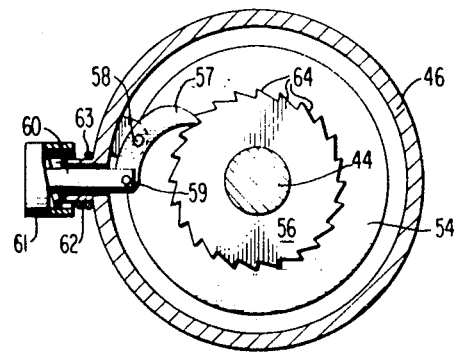
FIG 5
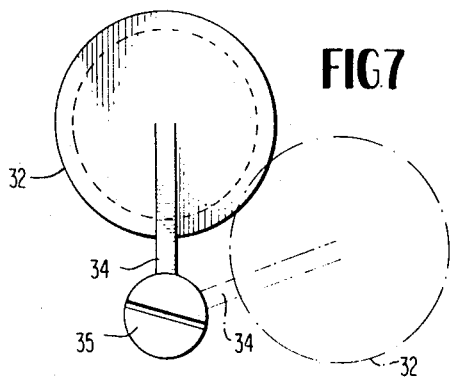
FIG 7
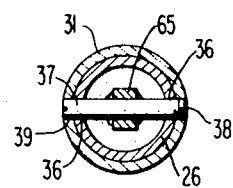
FIG 8
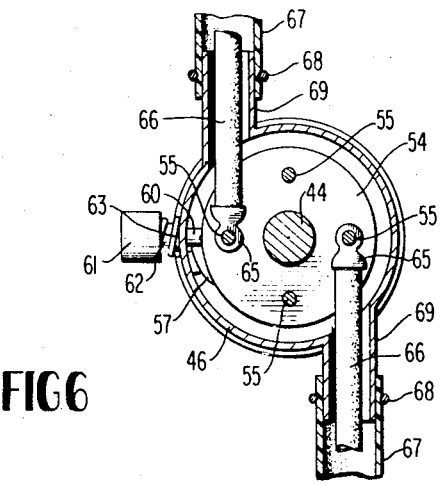
FIG 6
FIG 9
INVENTOR
ERNEST P COX

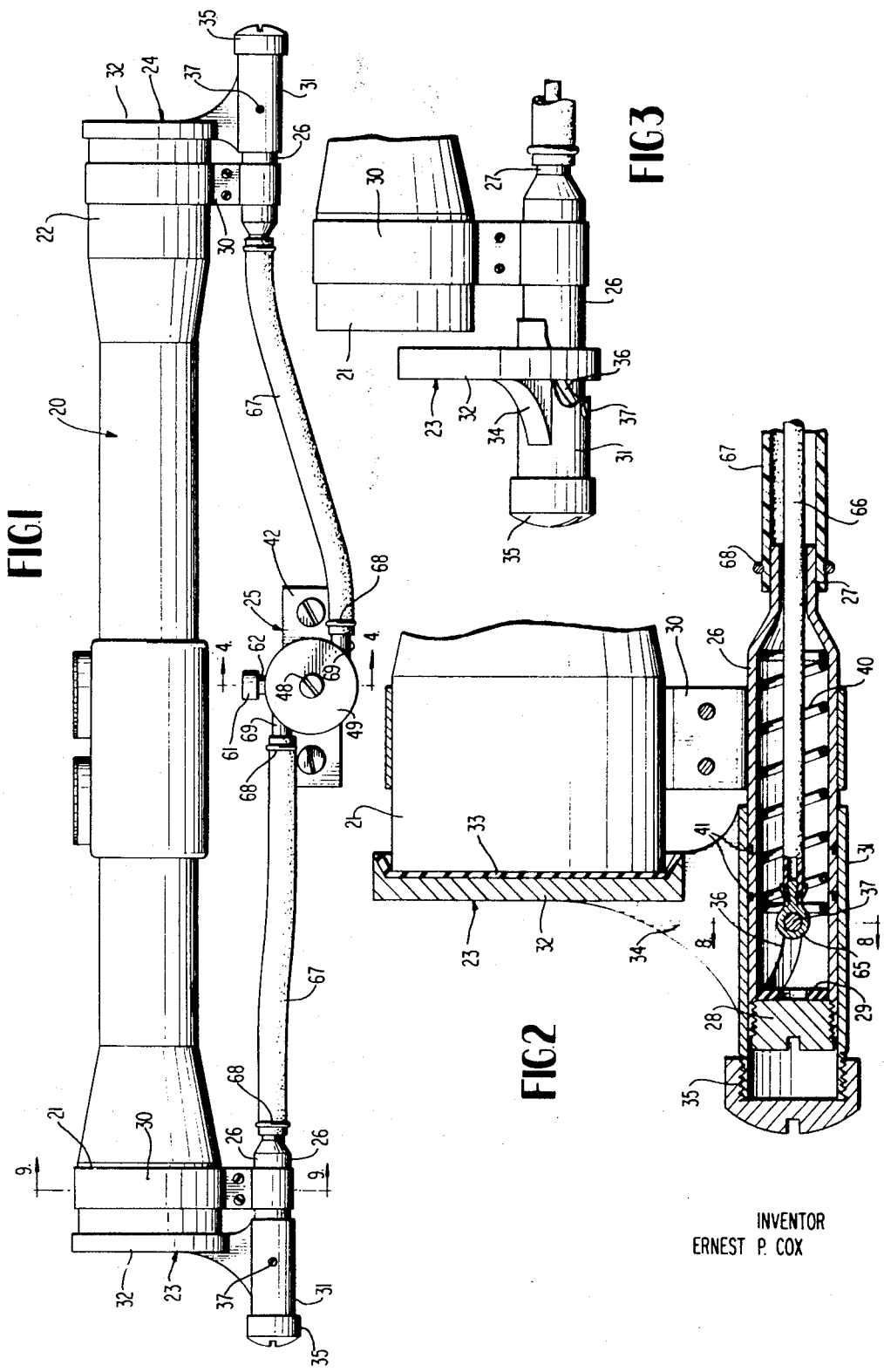

United States Patent Office 3,465,446
Patented Sept. 9, 1969

3,465,446
SCOPE SIGHT LENS PROTECTOR
Ernest P. Cox, P.O. Box 165, Seeley Lake, Mont. 59868
Filed Jan. 27, 1969, Ser. No. 794,315
Int. Cl. F41g 1/38, 1/42; G03b 11/04
U.S. Cl. 33—50                                      10 Claims

ABSTRACT OF THE DISCLOSURE

A rifle scope sight lens protector which is positive and reliable in operation and seals the lenses effectively from the outside elements when in the closed position. The release means for the lens protector elements is arranged to substantially eliminate accidental actuation. The protector elements are spring-biased to the open or release position and are closed by a simplified winding mechanism and ratchet means.

---

Scope sight lens protectors are quite well known in the art and examples of the prior art are shown in prior United States Patents 2,738,585, 2,968,099, 2,782,510 and 2,849,795. In general, the prior art protectors have had certain deficiencies in that they require separate manipulation of covers or protectors at the opposite end of the telescopic sight or the mechanisms for operating the two protectors simultaneously are complex and not entirely reliable, being subject to sticking and requiring adjustment.

The objective of this invention is to provide an entirely reliable and virtually fool-proof scope sight lens protector which overcomes the principal defects of the prior art and which is economical and practical to manufacture and easily adaptable to the telescopic sight of almost any rifle. Other objects and advantages of the invention will become fully apparent during the course of the following specification.

Brief description of the drawings

FIGURE 1 is a plan view of a scope sight and lens protector structure embodying the invention.

FIGURE 2 is an enlarged fragmentary central cross section through one end portion of the structure.

FIGURE 3 is a fragmentary plan view of one end portion of the structure showing one lens protector in an open or release position.

FIGURE 4 is an enlarged vertical section taken on line 4—4 of FIGURE 1.

FIGURE 5 is an enlarged horizontal section taken on line 5—5 of FIGURE 4.

FIGURE 6 is a similar view taken on line 6—6 of FIGURE 4.

FIGURE 7 is an end elevational view of the protector with parts omitted.

FIGURE 8 is a vertical section taken on line 8—8 of FIGURE 2.

FIGURE 9 is a vertical section taken on line 9—9 of FIGURE 1.

Description of the preferred embodiment

Referring to the drawings in detail, wherein like numerals designate like parts, the numeral 20 designates a conventional telescope gun sight including enlarged cylindrical head portions 21 and 22 at its opposite ends. The scope sight 20 mounts upon the rifle structure, not shown, in any conventional manner and this mounting need not be considered for a proper understanding of the invention herein.

The lens protector means forming the subject matter of the invention comprises a pair of end cover or protector units 23 and 24 which are substantially identical and an intermediate operating unit 25 which functions to release the two lens protectors simultaneously at proper times and to return the same to covering relationship with the ends of the scope sight. A detailed description of either one of the units 23 or 24 will serve adequately to describe both units.

Each unit 23 and 24 comprises an interior tube 26 having a reduced diameter neck 27 at one end and containing an adjustable screw-threaded plug 28 in its opposite end, said plug carrying a preferably resilient washer 29 on its interior end. The plug and washer serve as a stop for the associated lens protector in the open or release position, to be fully described. The tube 26 is held firmly in a clamp assembly 30 which also embraces the adjacent cylindrical head 21 or 22 of the scope sight, as shown.

Each cover or protector unit further comprises an exterior tube 31, slidably and rotatably mounted on the tube 26 and directly carrying the lens cover or protector 32 having a rubber-like moisture-proof gasket 33 on its interior face for direct contact with the adjacent end of the scope to effectively seal and protect the lens therein. The cover 32 is connected rigidly with the tube 31 by a suitable web member 34. The outer end of the tube 31 is preferably provided with a threaded dust cap 35, as shown.

Each relatively stationary interior tube 26 is provided in its opposite sides with oppositely curving slots 36, which receive therethrough a cross pin 37 having one end threaded as at 38, FIGURE 8, within an opening of the outer tube 31 and having its other end disposed within an opposite opening 39 of the outer tube 31. Consequently, when the pin 37 is shifted within the curved slots 36 toward the outer end of the scope sight, the cover 32 and associated outer tube 31 will shift somewhat axially outwardly and swing to one side through approximately seventy-five degrees of rotation as shown in FIGURES 3 and 7. The opening movement of the cover 32 will be limited by engagement of the cross pin 37 with the bumper washer 29. The pin 37 is constantly urged outwardly by a compressible coil spring 40 within the tube 26 having one end bearing against the cross pin as shown in FIGURE 2. Preferably a pair of small O-ring seals 41 are interposed between the tubes 26 and 31 as shown.

The operating unit 25 common to both lens protector units 23 and 24 is located midway therebetween near one side of the scope sight and consists of the following elements. A base plate 42 is adapted for attachment to the gun structure in a conventional manner and carries a lower bearing 43, FIGURE 4, for a winding shaft 44 and also carries an internally threaded ring 45 which receives the lower threaded end of a relatively stationary cylinder 46. The shaft 44 extends upwardly centrally through this cylinder and has a squared upper terminal end 47, secured as at 48 to a winding knob 49 whose skirt 50 overlaps the stationary cylinder 46 and is separated therefrom by a small O-ring seal 51. An upper nonrotatable bearing 52 for the winding shaft 44 is provided and the winding shaft forms part of a winding rotor which includes upper and lower discs 53 and 54, connected by preferably four axially extending circumferentially spaced bolts or rods 55 which collectively form a spool structure. The winding rotor additionally embodies a toothed ratchet wheel 56 rigid with the lower disc 54 and turning with the shaft 44, knob 49 and associated parts.

Rotation of the ratchet wheel 56 and the entire rotor in one direction is resisted by a pawl 57, pivoted at 58 to the cylinder 46. The other end of the pawl, FIGURE 5, is pivoted at 59 to the plunger 60 of a radially reciprocating release button 61, disposd near the lower end of the cylinder 46 and between the operating unit 25 and the scope sight 20, as shown in FIGURE 1, so that accidental operation of the release button is very unlikely. The plunger 60 extends radially through a short tubular side extension 62 of cylinder 46, surrounded by a compression spring 63 which bears against the outer end of the release button 61 and thereby holds the pawl 57 yieldingly in engagement with the ratchet wheel 56 but allows the tooth of the pawl to disengage the ratchet wheel whenever the release button is pressed inwardly against the force of the spring 63. When the winding knob 49 is turned for winding flexible elements, not yet described, on the spool composed of the rods 55, the spring-loaded pawl 57 merely rides over the inclined faces of the ratchet teeth 64, FIGURE 5.

The two cross pins 37 of protector units 23 and 24 are connected at all times with metal fittings 65 on the ends of flexible transmission tubes or elements 66 which pass through the reduced necks 27 and through the bores of plastic guide and protector tubes 67 whose opposite ends are secured by clamps 68 to the necks 27 and to generally tangential oppositely extending sleeve extensions 69 on the cylinder 46. As shown in FIGURE 6, the transmission tubes 66 project into the cylinder 46 and additional end fittings 65 thereon are connected with one diametrically opposed pair of the rods 55 or bolts. It should now be evident that when the winding knob 49 turns in the proper direction for causing the ratchet teeth 64 to skip under the pawl 57, the two flexible elements 66 will wind up on the spool structure composed of the four rods 55 inside of stationary cylinder 46. When this takes place, the outer terminals 65 attached to the cross pins 37 are drawn inwardly toward the unit 25 and against the force of springs 40 and the covers or protectors 32 are drawn into covering and sealing relationship with the ends of the scope sight, as depicted in FIGURES 1 and 2. When both covers 32 are firmly closed, they will be locked in position by the pawl 57 engaging behind one abrupt side of one tooth 64, FIGURE 5.

When it is desired to release the sight covers 32 for quick movement to the open positions, as shown in FIGURES 3 and 7, it is merely necessary to depress the release button 61, lifting the pawl 57 from the ratchet wheel 56 and instantly the springs 40 will act on the cross pins 37 whose coaction with the slots 36 will move the covers or protectors to the open positions clear of the gun sight lenses. Manual rewinding of the elements 66 by means of the knob 49 will return the covers to their lens protecting and sealing positions.

The various features and advantages of the invention should be apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention.

I claim:

1. A scope sight protector comprising end lens protector units, each unit comprising a relatively stationary part and a movable part rotatably and slidably mounted on the stationary part, means for attaching each stationary part to one end portion of the scope sight, a lens cover element carried by each movable part, an intermediate operating unit for said protector units and adapted for attachment to gun structure, said operating unit comprising a manual winding spool and support bearing means for said spool, pawl and ratchet means on the operating unit connected with said spool and having a manual release element, flexible elements interconnecting said winding spool and said movable parts of the lens protector units, and springs on the protector units biasing said movable parts and lens cover elements to open positions upon release of the pawl and ratchet means, turning of the manual winding spool in one direction returning the lens cover elements to closed positions and the pawl and ratchet means then releasably locking the cover elements in said closed positions with the flexible elements wound on said spool.

2. The structure of claim 1, wherein said relatively stationary and movable parts of each length protector unit are respectively an inner tube and an outer tube having a swiveled telescope mounting on the inner tube, a clamp securing the inner tube to one end portion of the scope sight, camming means interconnecting the inner and outer tubes and said flexible elements connected with the camming means.

3. The structure of claim 2, wherein the camming means comprises curved slots in the inner tube and coacting openings in the outer tube, and a cross pin engaging through said slots and contacting openings and having a connection with one of said flexible elements, one of said springs disposed in the inner tube and bearing against the cross pin.

4. The structure of claim 3, and an adjustable plug element in the inner tube forming a limit stop for the movement of the cross pin within said curved slots.

5. The structure of claim 1, wherein said operating unit comprises a relatively stationary cylinder and said manual winding spool is journaled within the cylinder and includes a toothed ratchet wheel, a single tooth pawl pivoted to the cylinder and engageable with the teeth of the ratchet wheel, and a spring loaded release button on said cylinder pivotally connected with said pawl and biasing the pawl into engagement with the teeth of the ratchet wheel, said release button depressable to disengage the pawl from said teeth, and said flexible elements secured to said manual winding spool near diametrically opposite sides thereof.

6. The structure of claim 5, wherein said release button is disposed on one side of said cylinder with its operating head between the cylinder and said scope sight to preclude accidental actuation of the release button.

7. The structure of claim 1, and protective guide conduits for said flexible elements connected with the operating unit and said lens protector units.

8. The structure of claim 7, and wherein all of said units have tubular extensions over which ends of said conduits are telescoped, and clamps releasably securing the ends of the conduits tightly to the tubular extensions.

9. The structure of claim 5, wherein said manual winding spool comprises a winding shaft, bearings for end portions of the winding shaft secured to said cylinder, a winding knob on one end of said shaft externally of said cylinder, a pair of discs on said shaft inwardly of said bearings, and plural circumferentially spaced rod elements secured to and extending between said discs in surrounding relation to the shaft, said flexible elements having corresponding ends attached to an opposed pair of the rod elements.

10. The structure of claim 1, and a camming means interconnecting each stationary part and movable part, whereby the movable part and said lens cover elements may retract from the adjacent end of the scope sight and swing to one side of the scope sight under the power of one of said springs when the pawl and ratchet means releases the manual winding spool.

References Cited

UNITED STATES PATENTS 2,657,465  11/1953  Lloyd.
2,782,510  2/1957  Kramm.

SAMUEL S. MATTHEWS, Primary Examiner

U.S. Cl. X.R.

350—65